United States Patent
Villafani Caballero et al.

(10) Patent No.: US 12,451,987 B1
(45) Date of Patent: Oct. 21, 2025

(54) CONTROLLING TRANSIENT EFFECTS IN SPECTRAL CHANGES DUE TO CHANNEL DROP SCENARIOS

(71) Applicant: Amazon Technologies, Inc., Seattle, WA (US)

(72) Inventors: Diego Rodrigo Villafani Caballero, Dublin (IE); Lee Richardson, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 18/082,413

(22) Filed: Dec. 15, 2022

(51) Int. Cl.
*H04J 14/02* (2006.01)

(52) U.S. Cl.
CPC ................................ *H04J 14/0212* (2013.01)

(58) Field of Classification Search
None
See application file for complete search history.

(56) References Cited

U.S. PATENT DOCUMENTS

| | | | | |
|---|---|---|---|---|
| 6,088,141 | A * | 7/2000 | Merli | H04L 1/22 398/1 |
| 6,404,525 | B1 * | 6/2002 | Shimomura | H04B 10/03 398/9 |
| 8,064,770 | B2 | 11/2011 | Manna | |
| 8,111,995 | B2 * | 2/2012 | Wisseman | G02B 6/2931 398/83 |
| 10,298,317 | B2 * | 5/2019 | Mertz | H04B 10/07955 |
| 10,707,958 | B2 * | 7/2020 | Searcy | H04B 10/58 |
| 11,245,488 | B2 * | 2/2022 | St-Laurent | H01S 3/2391 |
| 11,742,938 | B2 * | 8/2023 | Pratapa | H04J 14/02216 398/1 |
| 12,199,741 | B2 * | 1/2025 | Mukai | H04B 10/506 |
| 2024/0137142 | A1 * | 4/2024 | Cai | H04J 14/0221 |

FOREIGN PATENT DOCUMENTS

EP      1241913 A1 * 9/2002 .......... H04J 14/0213

OTHER PUBLICATIONS

Sunderwirth, Jonathan, Fiber Optic 101 and Cable Selection, 2017 (Year: 2017).*

* cited by examiner

*Primary Examiner* — Jai M Lee
(74) *Attorney, Agent, or Firm* — Klarquist Sparkman, LLP

(57) ABSTRACT

Optical add-drop multiplexers (OADMs) connect two or more network terminals in an optical network to perform wavelength division multiplexing. If a channel in an optical connection between an OADM and a terminal is interrupted for any reason such that the signal in the channel drops, transient effects such as spectral hole burning may occur which impacts neighboring channels. One approach to avoiding such transient effects in channel drop scenarios includes filling in the spectral hole so that neighboring channels are transmitted without any degradation. An OADM includes a broad spectral source, such as an amplified spontaneous emission (ASE) source, and an optical switch that replaces dropped channels with ASE. By providing an automatic mechanism for spectrum filling within the OADM itself in this way, high-capacity optical transmission networks are stable against transient effects even in the presence of channel drops or fiber cuts.

20 Claims, 7 Drawing Sheets

CONTROLLING TRANSIENT EFFECTS IN SPECTRAL CHANGES DUE TO CHANNEL DROP SCENARIOS

BACKGROUND

Long-haul optical fiber networks provide telecommunication connectivity over long distances. In order to maximize the transmission capacity of such a network, each optical fiber carries multiple optical signals in a wavelength division multiplex (WDM) system. For example, a modern WDM system for a long-haul optical fiber network may carry dozens of channels with a large amount of traffic. Further, amplifiers may amplify the optical signals to compensate for signal attenuation as the optical signals are transmitted over long distances. If fiber events such as a channel drop occur, where the signal in a given channel is lost such that there is a hole in the transmission spectrum, transient effects such as spectral hole burning may occur which impact neighboring channels.

DETAILED DESCRIPTION

Optical add-drop multiplexers (OADM) are devices used in WDM systems to multiplex and route different channels of light into or out of optical fibers. OADMs can add new wavelength channels to existing WDM signals and can drop or remove channels from existing WDM signals and route such channels to another network path. To that end, OADMs include, among other elements, optical switches that filter signals and selectively route signals into different paths. An example of such an optical switch is a wavelength selective switch (WSS) that can selectively switch channels from one port to separate ports, or vice-versa, based on wavelength. OADMs that include remotely configurable WSS components are reconfigurable OADMs (ROADMs), while OADMs that include fixed wavelength-dependent multiplexers/demultiplexer components are fixed OADMs (FOADMs).

OADMs are intermediate nodes that connect two or more network terminals in an optical network to perform WDM. If a channel in an amplified optical connection between an OADM and a terminal is interrupted for any reason such that the signal in the channel drops, transient effects and spectral hole burning may occur which impacts neighboring channels. One approach to mitigate such transient effects and avoid spectral hole burning in channel drop scenarios includes filling in the spectral hole so that neighboring channels are transmitted without any degradation. To that end, an OADM may include a broadband spectral source, such as an amplified spontaneous emission (ASE) source, as well as an optical switch that replaces the dropped channel with an ASE channel. By providing an automatic fast-switching mechanism for spectrum filling within the OADM itself in this way, high-capacity optical transmission networks are stable against transient effects even in the presence of channel drops or fiber cuts.

Figure 1:
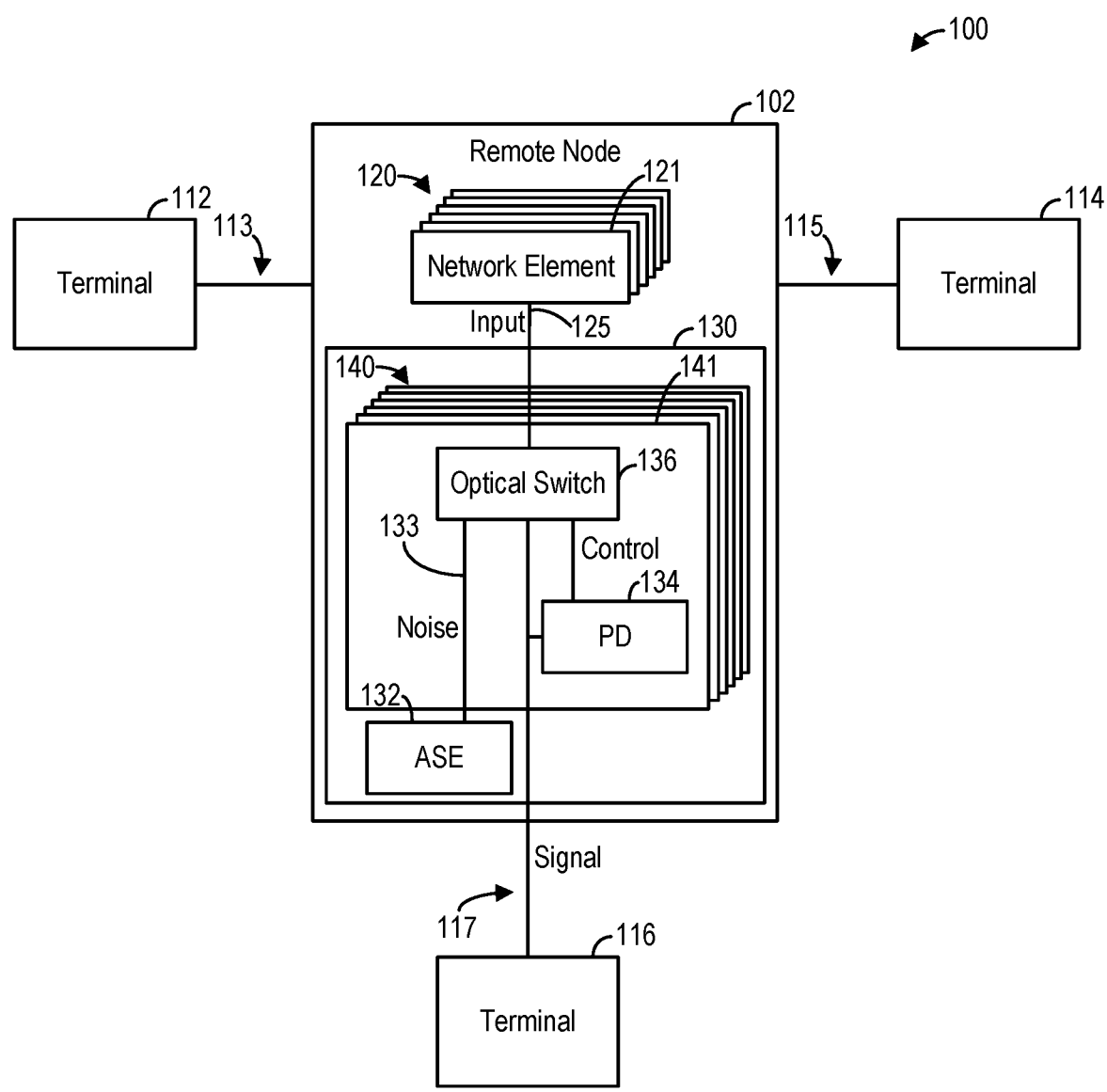
FIG. 1 shows a block diagram illustrating an example system for automatically controlling transient effects in spectral changes due to channel drop scenarios in a network system.

FIG. 1 show a block diagram illustrating an example system 100 for automatically controlling transient effects in spectral changes due to channel drop scenarios in a network system. The system 100 comprises a remote node 102 communicatively coupled to multiple network terminals, including a first terminal 112, a second terminal 114, and a third terminal 116. The remote node 102 selectively routes channels between the terminals 112, 114, and 116 via a plurality of network elements 120, including at least network elements 121. The network elements 120 may comprise wavelength selective switch (WSS) elements, as an illustrative and non-limiting example. The terminals 112, 114, and 116 are connected to the remote node 102 via optical fibers 113, 115, and 117 respectively, wherein at least one of the optical fibers 113, 115, and 117 is an amplified optical fiber. The remote node 102 may comprise an optical add-drop multiplexer (OADM), such as a ROADM, a FOADM, or another device configured for optical add-drop multiplexing.

The remote node 102 further comprises a transient effect control module 130 configured to fill any spectral gaps in the channels. Specifically, the transient effect control module 130 comprises an amplified spontaneous emission (ASE) source 132 configured to generate amplified spontaneous emissions across a broadband spectrum of wavelengths. For example, the ASE source 132 may generate broadband noise across a full C-band spectrum or a full L-band spectrum covering all potential wavelengths that may be transported through the remote node 102. The transient effect control module 130 further comprises a photodetector (PD) 134 configured to monitor an optical fiber, such as the optical fiber 117 as depicted, and detect whether a signal carried by the optical fiber 117 is dropped. The transient effect control module 130 further comprises an optical switch 136 configured to switch a dropped channel with the ASE source 132 in response to detecting the channel drop via the photodetector 134. For example, the ASE source 132 is coupled to the optical switch 136 via an optical fiber 133. Responsive to a signal drop detected in the optical fiber 117 by the photodetector 134, the optical switch 136 thus switches the input 125 to network element 121 from the optical fiber 117 to the optical fiber 133. The ASE signal (e.g., amplified spontaneous emissions or noise) from ASE source 132 is thus carried by the optical fiber 133 and input to a network element 121 of the network element 120 responsive to the channel drop. As the network element 121 may comprise a WSS configured to filter for the channel that was dropped, the network element 121 filters the ASE signal to an identical bandwidth of the dropped channel, and adds the filtered ASE signal to one or more output ports of the network element 121. In this way, the transient effect control module 130 automatically replaces any dropped signal with a noise signal generated by the ASE source 132, thereby preventing transient effects in spectral changes. The transient effect control module 130 performs such replacement in under fifty milliseconds, for example. In contrast, existing systems may take as long as ten seconds or even up to fifteen minutes or more to resolve a channel drop issue, during which time transient effects such as spectral hole burning can occur, thereby degrading the quality of optical transmission in other channels and causing transmission errors. The transient effect control module 130 re-uses the same input port in the network element 120 for the input channels and the amplified spontaneous emissions, thereby avoiding the use of an additional input port for the amplified spontaneous emissions which would need to be reconfigurable according to the input channels. The transient effect control module 130 therefore provides substantial advantages over existing systems. Further, in some examples, the transient effect control module 130 enables the continued transmission of other channels in an optical fiber from a terminal with the dropped channel, rather than discontinuing all transmissions in an optical fiber with the dropped channel from the terminal or rerouting transmissions between other terminals.

The number of network elements 120 comprising the remote node 102 may depend on the number of traffic directions, such that the plurality of network elements 120 comprises a separate network element 121 for each direction of traffic. In the depicted example of three terminals 112, 114, and 116, and assuming bidirectional traffic between the remote node 102 and each terminal, there are six directions of traffic and thus six network elements 120. The transient effect control module 130 may comprise a plurality of transient effect control submodules 140 including transient effect control submodule 141, where each transient effect control submodule 140 monitors a given direction of traffic and thus corresponds to a respective network element 120. In the depicted example of six network elements 120, the plurality of transient effect control submodules 140 comprises six transient effect control submodules, with each transient effect control submodule coupled to a respective network element 120. For example, the transient effect control submodule 141 comprises the photodetector 134 and the optical switch 136, such that the transient effect control submodule 141 monitor incoming traffic on the optical fiber 117, for example, with the photodetector 134 and selectively switches input 125 to the network element 121 from the optical fiber 117 to the optical fiber 133 carrying amplified spontaneous emissions or noise responsive to the signal carried by the optical fiber 117 dropping.

Further, while the transient effect control module 130 comprises a plurality of transient effect control submodules 140, the transient effect control module 130 may comprise at least one ASE source 132 which provides amplified spontaneous emissions or noise to each of the plurality of transient effect control submodules 140.

The system thus uses an optical signal that transmits a broadband light source (like an ASE noise generator) and an optical switch. In normal conditions, one branch of the optical switch is connected to the optical channels coming from a fiber that is connected to a terminal or another remote node of a network. The optical switch is activated and changes to the branch of the broadband light source when the channels from the terminal are dropped (due to a fiber cut or any other issue). This will reduce or cancel the impact caused by spectral hole burning (SHB) and the associated effects on the surviving channels. The optical switch can be installed in different parts of the node, depending on the architecture and it is scalable to the number of directions of the OADM.

Figure 2:
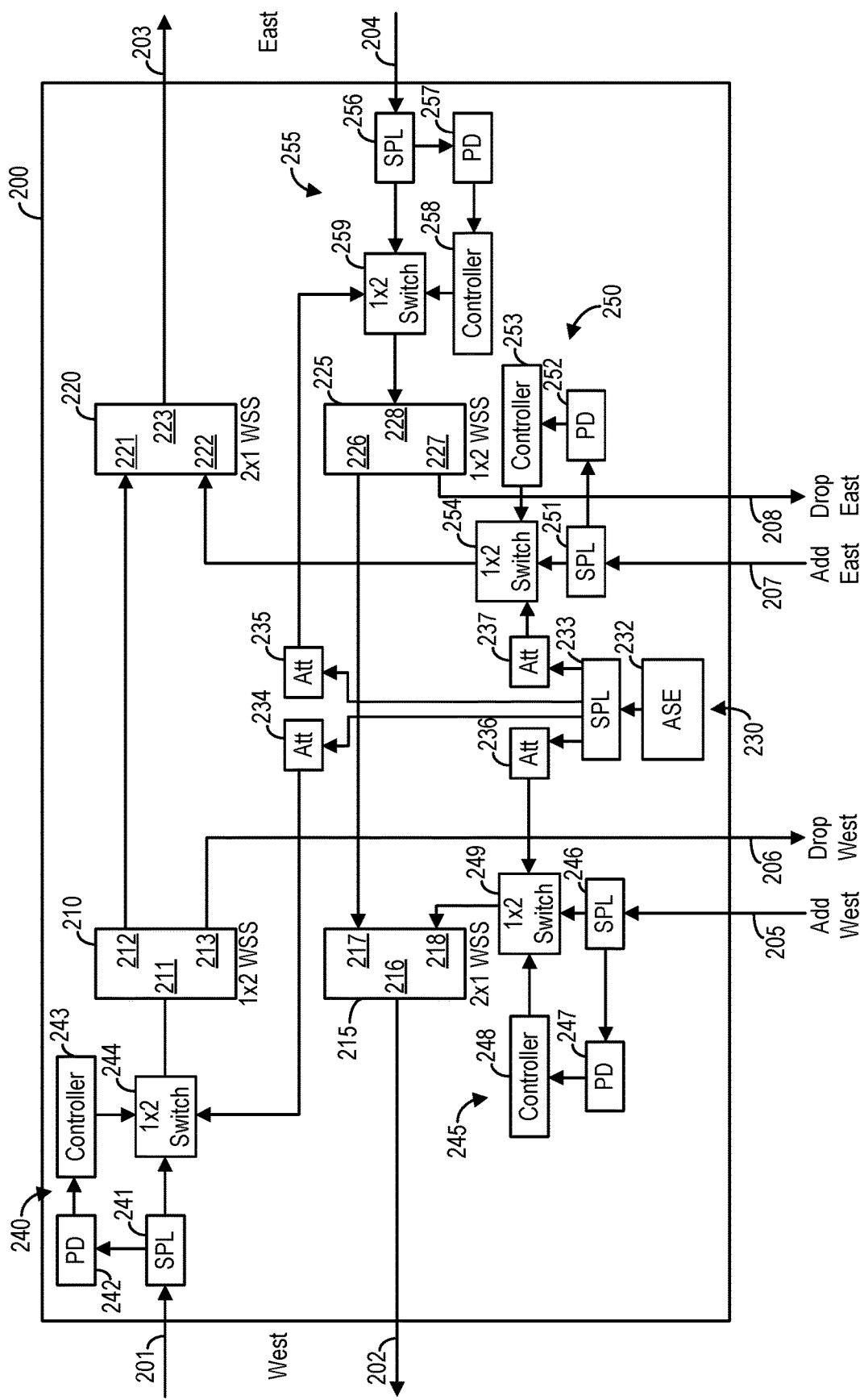
FIG. 2 shows a block diagram illustrating an example optical add-drop multiplex system for automatic control of transient effects in spectral changes due to channel drop scenarios.

FIG. 2 shows a block diagram illustrating an example optical add-drop multiplex system 200 for automatic control of transient effects in spectral changes due to channel drop scenarios. In particular, the OADM system 200 depicts a generalized scheme for adding an ASE load when loss of power is detected on an incoming port. The OADM system 200 as depicted enables add (multiplex) and drop (demultiplex) for west-east traffic, with incoming signal 201 and outgoing signal 202 for the western traffic, outgoing signal 203 and incoming signal 204 for the eastern traffic, incoming add signal 205 for adding one or more signals to the outgoing west signal 202, outgoing drop signal 206 for dropping one or more signals from the incoming west signal 201, incoming add signal 207 for adding one or more signals to the outgoing cast signal 203, and outgoing drop signal 208 for dropping one or more signals from the incoming cast signal 204. It should be appreciated that while two directions of traffic are depicted with add-drop signals for each direction, the systems and components provided herein for controlling transient effects can be extended to include additional network paths, additional add channels, and additional drop channels.

The OADM system 200 includes a wavelength selective switch (WSS) for each incoming and outgoing signal. For example, WSS 210 comprises a 1×2 WSS that takes the incoming signal 201 at input port 211, outputs a signal from the output port 212, and outputs the outgoing drop signal 206 from the output port 213, where the WSS 210 demultiplexes the incoming signal 201 such that the output signal from the output port 212 does not include the one or more dropped signals of the outgoing drop signal 206. WSS 215 comprises a 2×1 WSS that takes an eastern signal at the input port 217, the incoming add signal 205 at the input port 218, and outputs the outgoing west signal 202 from the output port 216, where the WSS 215 multiplexes the input signals at ports 217 and 218 to provide the outgoing west signal 202. Similarly, WSS 220 comprises a 2×1 WSS that takes the demultiplexed signal from output port 212 of WSS 210 as input at the input port 221, the incoming add signal 207 at the input port 222, and outputs the outgoing cast signal 203, where the WSS 220 multiplexes the signals input at ports 221 and 222 together to provide the outgoing cast signal 203. WSS 225 comprises a 1×2 WSS that takes the incoming cast signal 204 at input port 228, outputs a demultiplexed signal at the output port 226, and outputs the outgoing drop signal 208 from the output port 227, where the WSS 225 demultiplexes the incoming cast signal 204 to provide the demultiplexed signal at port 226 without the dropped channels of the outgoing drop signal 208. It should be appreciated that one or more of the optical switches may selectively not add or drop signals, such that the output signals are not demultiplexed or multiplexed (i.e., where traffic may pass-through a given WSS). Further, it should be appreciated that the dimensions of the WSS elements depicted, such as 1×2 or 2×1, is illustrative and non-limiting, and that these dimensions scale with the number of traffic directions (e.g., to 1×3 or 3×1 for three traffic directions, 1×4 or 4×1 for four traffic directions, and so on).

As depicted, the OADM system 200 includes a transient effect control module 230 configured to automatically control transient effects in spectral changes according to an example. The transient effect control module 230 comprises an ASE source 232, as well as transient effect control submodules for each WSS, such as transient effect control submodule 240 for the WSS 210, transient effect control submodule 245 for the WSS 215, transient effect control submodule 250 for the WSS 220, and transient effect control submodule 255 for the WSS 225.

For example, transient effect control submodule 240 provides transient effect control for the WSS 210, and comprises a splitter 241 that splits the incoming west signal 201, a photodetector 242 that monitors the incoming west signal 201 for dropped channels, a controller 243 configured to provide automatic control responsive to the photodetector 242, and a 1×2 switch 244 inline with the incoming west signal 201. ASE generated by the ASE source 232 is split by splitter 233 and sent to corresponding attenuators for each transient effect control submodule. For example, the attenuator 234 of the transient effect control submodule 240 attenuates the ASE output by the ASE source 232, and this attenuated ASE is provided to the switch 244. If the photodetector 242 detects a drop in the incoming west signal 201, the controller 243 automatically controls the switch 244 to switch the input to the input port 211 from the incoming west signal 201 to the attenuated ASE from the attenuator 234. As the WSS 210 is configured to filter the incoming west signal 201 and selectively route the filtered signal to output ports 212 and 213, the WSS 210 filters the attenuated ASE to match the intended spectrum of the incoming west signal 201 without any updates to or reconfiguration of the WSS 210 responsive to the switching. Further, the filtered and attenuated ASE fills the spectrum gaps of the output signals at the output ports 212 and 213.

Similarly, transient effect control submodule 245 provides transient effect control for the WSS 215, and comprises a splitter 246 that splits the incoming add signal 205, a photodetector 247 that monitors the incoming add signal 205 for dropped channels, a controller 248 configured to provide automatic control responsive to the photodetector 247, and a 1×2 switch 249 inline with the incoming add signal 205. Attenuator 236 of the transient effect control submodule 245 attenuates the ASE output by the ASE source 232, and this attenuated ASE is provided to the switch 249. If the photodetector 247 detects a drop in the incoming add signal 205, the controller 248 automatically controls the switch 249 to switch the input to the input port 218 from the incoming add signal 205 to the attenuated ASE from the attenuator 236. As the WSS 215 is configured to filter the incoming add signal 205 and selectively multiplex with the input at port 217 to provide the outgoing west signal 202 at port 216, the WSS 215 filters the attenuated ASE to match the intended spectrum of the incoming add signal 205 without any updates to the WSS 215 responsive to the switching. The filtered and attenuated ASE thus fills the spectrum gaps in the outgoing west signal 202.

Transient effect control submodule 250 provides transient effect control for the WSS 220, and comprises a splitter 251 that splits the incoming add signal 207, a photodetector 252 that monitors the incoming add signal 207 for dropped channels, a controller 253 configured to provide automatic control responsive to the photodetector 252, and a 1×2 switch 254 inline with the incoming add signal 207. Attenuator 237 of the transient effect control submodule 250 attenuates the ASE output by the ASE source 232, and this attenuated ASE is provided to the switch 254. If the photodetector 252 detects a drop in the incoming add signal 207, the controller 253 automatically controls the switch 254 to switch the input to the input port 222 from the incoming add signal 207 to the attenuated ASE from the attenuator 237. As the WSS 220 is configured to filter the incoming add signal 207 and selectively multiplex this signal with the demultiplexed incoming west signal input at port 221 to provide the outgoing cast signal 203 at port 223, the WSS 220 filters the attenuated ASE to match the intended spectrum of the incoming add signal 207 without any updates to the WSS 220 responsive to the switching. The filtered and attenuated ASE thus fills the spectrum gaps in the outgoing cast signal 203.

Transient effect control submodule 255 provides transient effect control for the WSS 225, and comprises a splitter 256 that splits the incoming cast signal 204, a photodetector 257 that monitors the incoming cast signal 204 for dropped channels, a controller 258 configured to provide automatic control responsive to the photodetector 257, and a 1×2 switch 259 inline with the incoming cast signal 204. Attenuator 235 of the transient effect control submodule 255 attenuates the ASE output by the ASE source 232, and this attenuated ASE is provided to the switch 259. If the photodetector 257 detects a drop in the incoming cast signal 204, the controller 258 automatically controls the switch 259 to switch the input to the input port 228 from the incoming cast signal 204 to the attenuated ASE from the attenuator 235. As the WSS 225 is configured to filter the incoming east signal 204 and selectively demultiplex the signal to provide the demultiplexed outgoing signal at port 226 and the outgoing drop signal 208 at output port 227, the WSS 225 filters the attenuated ASE to match the intended spectrum of the incoming cast signal 204 without any updates to the WSS 225 responsive to the switching. The filtered and attenuated ASE thus fills the spectrum gaps in the outgoing demultiplexed signal and/or the outgoing drop signal 208.

The controllers 243, 248, 253, and 258 comprise computing devices configured to automatically control the respective switches 244, 249, 254, and 259 in order to automatically control transient effects in spectral changes. The controllers 243, 248, 253, and 258 may therefore comprise, as an illustrative and non-limiting example, a processor and a memory storing executable instructions that when executed by the processor cause the processor to perform actions, such as command the respective switch to change source. In some examples, the controllers 243, 248, 253, and 258 may also automatically switch back to the original source from the ASE 232, for example responsive to detecting a restored signal with the respective photodetector or after waiting for a predetermined duration. In other examples, the controllers 243, 248, 253, and 258 may wait for commands received via the respective input signals monitored by the respective photodetector, wherein such commands instruct the controller(s) to switch back. Further, although separate controllers are depicted for each transient effect control submodule, it should be appreciated that an OADM such as OADM system 200 may include a single controller for providing transient effect control.

Figure 3:
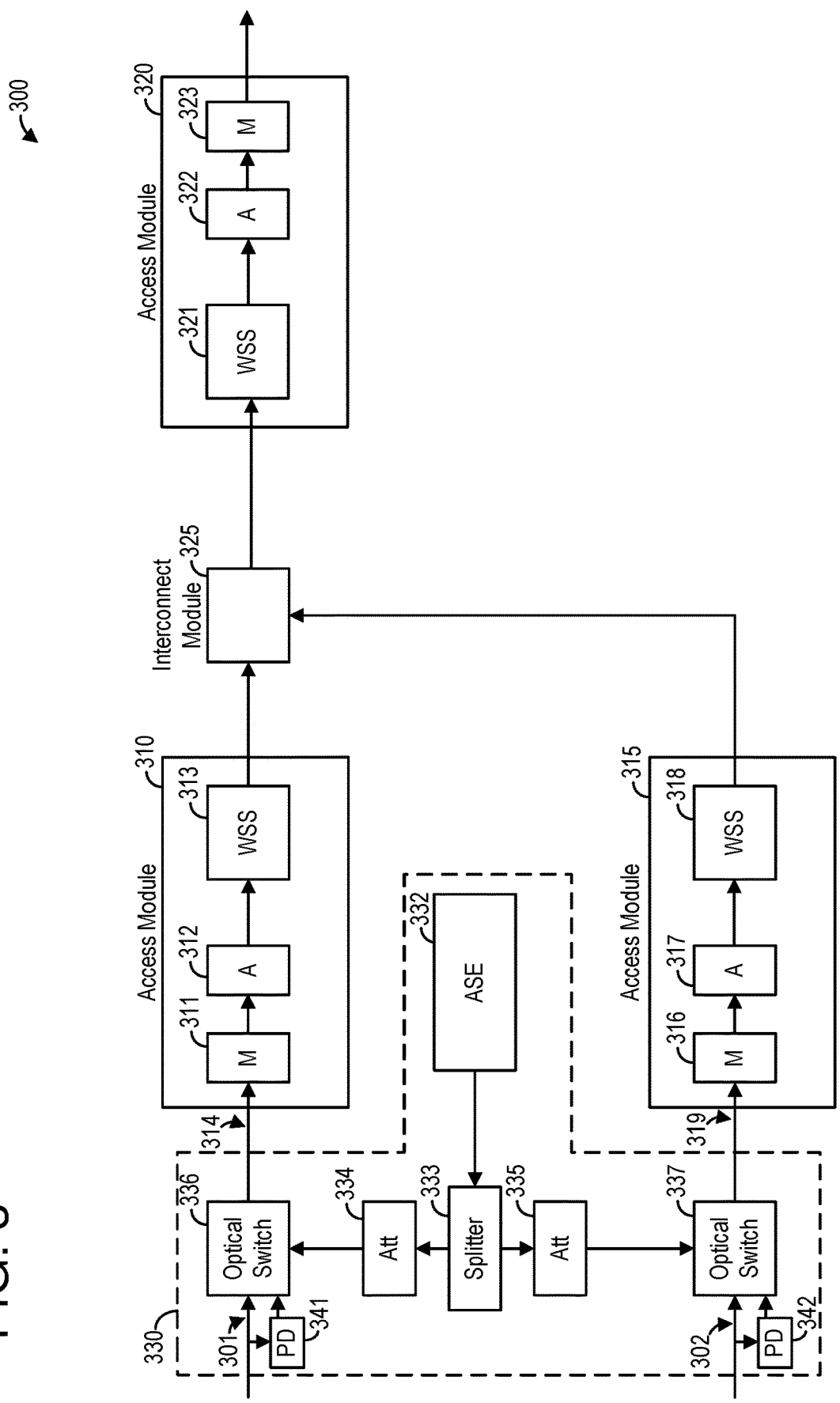
FIG. 3 shows a block diagram illustrating an example system with a transient effect control module configured external to network access modules according to an example.

FIG. 3 shows a block diagram illustrating an example system 300 with a transient effect control module 330 configured external to network access modules according to an example. The system 300 includes multiple access modules 310, 315, and 320 that are interconnected by an interconnect module 325. The access modules 310, 315, and 320 as well as the interconnect module 325 may comprise network elements that are interconnected to provide optical transport of information according to a given configuration, and the depicted example is illustrative and non-limiting. As illustrative and non-limiting examples, the access module 310 comprises a module 311, an amplifier 312, and a WSS 313. Similarly, the access module 315 comprises a module 316, an amplifier 317, and a WSS 318, and the access module 320 comprises a WSS 321, an amplifier 322, and a module 323.

As depicted, the system 300 comprises a transient effect control module 330 configured external to the access modules 310, 315, and 320 to provide automatic control of transient effects due to channel drop scenarios. The transient effect control module 330 comprises an ASE source 332 configured to generate ASE across a full C band. The transient effect control module 330 further comprises a splitter 333 that splits the ASE from the ASE source 332, variable optical attenuators (VOAs) 334 and 335 configured to attenuate the optical signal power levels of the ASE, and optical switches 336 and 337. The optical switch 336 is positioned inline with the incoming signal 301 of the access module 310, while the optical switch 337 is positioned inline with the incoming signal 302 of the access module 315. The optical switch 336 is configured to pass the incoming signal 301 through as input signal 314 to the access module 310. The optical switch 336 is configured to automatically update the input signal 314 to the access module 310 by automatically switching the incoming signal 301 with the attenuated ASE from VOA 334 responsive to the incoming signal 301 dropping. Similarly, the optical switch 337 is configured to pass the incoming signal 302 through as input signal 319 to the access module 315. The optical switch 337 is configured to automatically update the input signal 319 to the access module 315 by automatically switching the incoming signal 302 with the attenuated ASE from VOA 335 responsive to the incoming signal 302 dropping. In order to provide fast responsive switching at the optical switches 336 and 337, a photodetector 341 monitors the incoming signal 301 while a photodetector 342 monitors the incoming signal 302 to detect signal drop in the respective signals.

Figure 4:
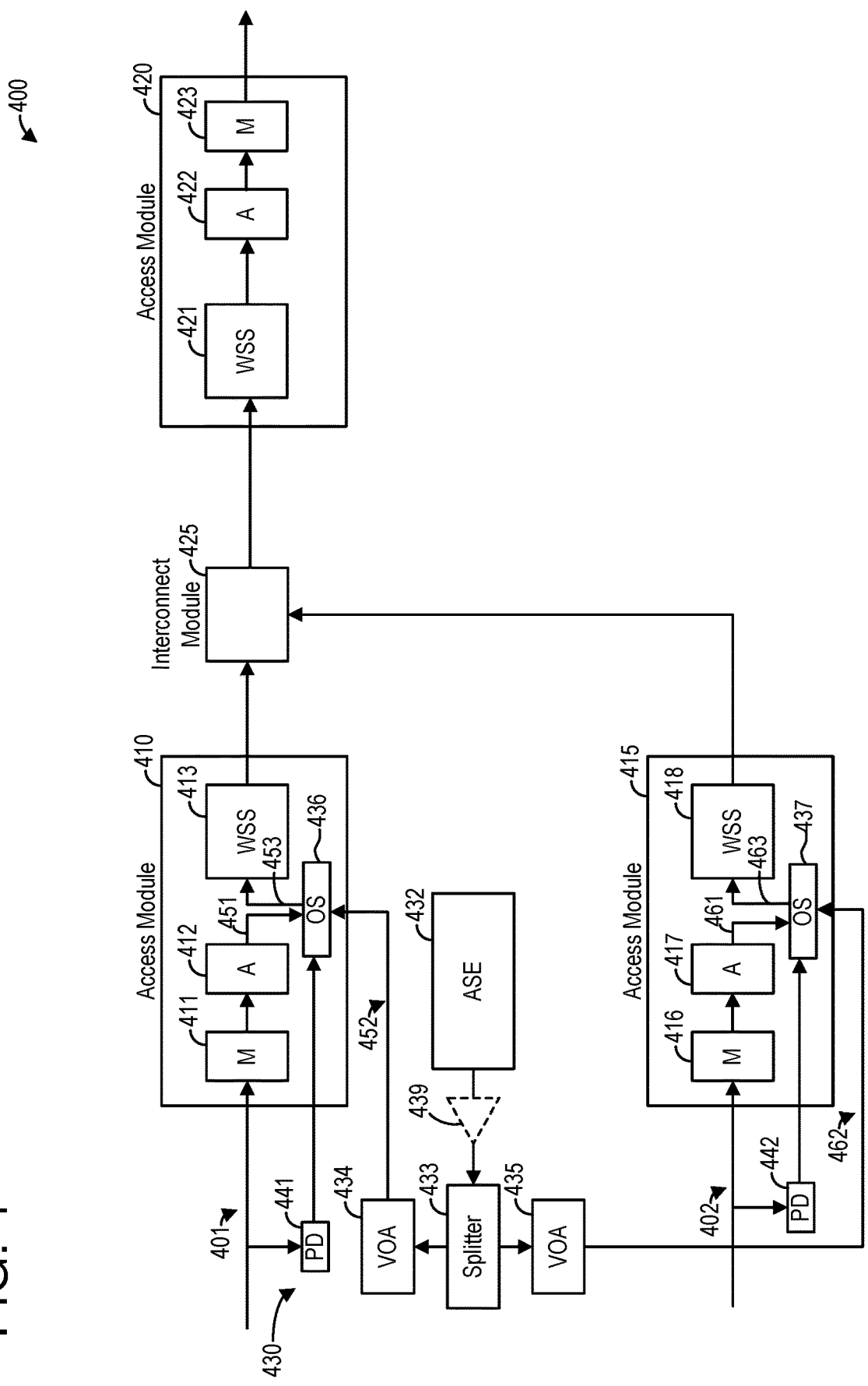
FIG. 4 shows a block diagram illustrating an example system with a transient effect control module at least partially integrated into network access modules according to another example.

As another example, FIG. 4 shows a block diagram illustrating an example system 400 with a transient effect control module at least partially integrated into network access modules. Similar to the system 300, the system 400 includes multiple access modules 410, 415, and 420 that are interconnected by an interconnect module 425. The access modules 410, 415, and 420 as well as the interconnect module 425 may comprise network elements that are interconnected to provide optical transport of information according to a given configuration, and the depicted example is illustrative and non-limiting. As illustrative and non-limiting examples, the access module 410 comprises a module 411, an amplifier 412, and a WSS 413. Similarly, the access module 415 comprises a module 416, an amplifier 417, and a WSS 418, and the access module 420 comprises a WSS 421, an amplifier 422, and a module 423.

As depicted, the system 400 comprises a transient effect control module 430 at least partially integrated with the access the access modules 410 and 415 to provide automatic control of transient effects due to channel drop scenarios arising from incoming signals 401 and 402. The transient effect control module 430 comprises an ASE source 432 configured to generate ASE across a full C band. The transient effect control module 430 further comprises a splitter 433 that splits the ASE from the ASE source 432, attenuators 434 and 435 (which may comprise variable optical attenuators (VOAs) or fixed attenuators) configured to attenuate the optical signal power levels of the ASE, and optical switches 436 and 437. The optical switch 436 is integrated into the access module 410, while the optical switch 437 is integrated into the access module 415. As depicted, the optical switch 436 is inline with an internal signal 451 of the access module 410. The optical switch 436 is configured to pass the internal signal 451 through as internal input signal 453 to the WSS 413 of the access module 410, as depicted. The optical switch 436 is configured to automatically update the internal input signal 453 to the WSS 413 by automatically switching the internal signal 451 with the attenuated ASE 452 from attenuator 434 responsive to the internal signal 451 dropping. Similarly, the optical switch 463 is inline with an internal signal 461 of the access module 415. The optical switch 437 is configured to pass the internal signal 461 through as internal input signal 463 to the WSS 418 of the access module 415, as depicted. The optical switch 437 is configured to automatically update the internal input signal 463 to the WSS 418 by automatically switching the internal signal 461 with the attenuated ASE 462 from attenuator 435 responsive to the internal signal 461 dropping. Photodetectors 441 and 442 monitor the incoming signals 401 and 402, respectively, to enable fast switching of the optical switches 436 and 437, respectively, responsive to the photodetectors 441 and 442 detecting signal drops in the respective incoming signals 401 and 402.

The transient effect control module 430 may optionally comprise an amplifier 439 configured to amplify ASE generated by the ASE source 432 to account for the integration of the optical switches 436 and 437 to the network devices, depending on the configuration of the access module 410 and 415, for example.

Figure 5:
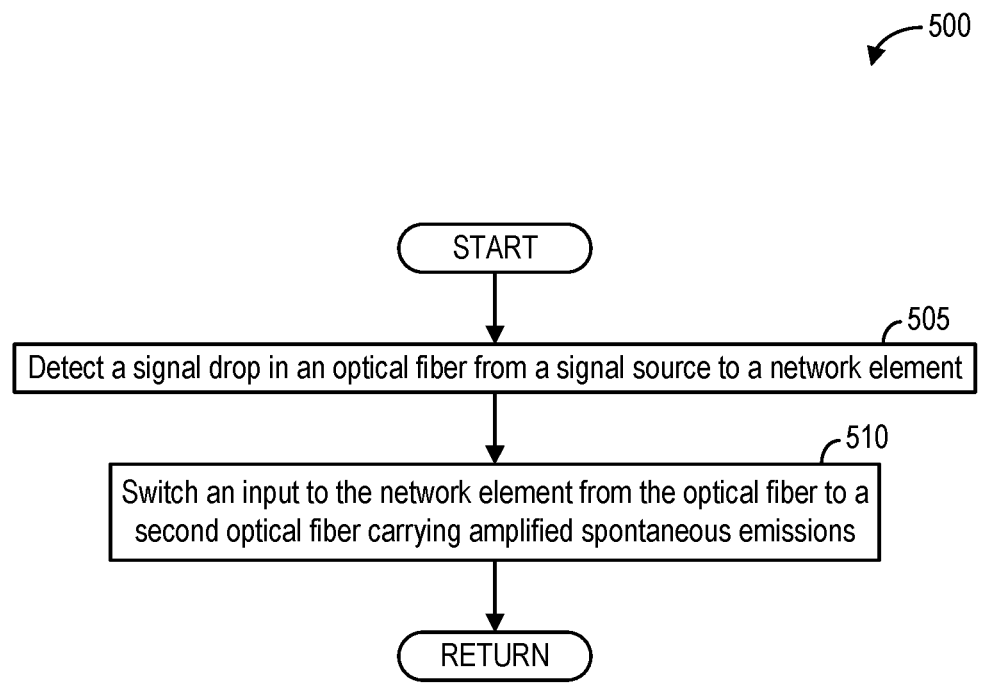
FIG. 5 shows a high-level flow chart illustrating an example method for automatically controlling transient effects in spectral changes due to channel drop scenarios.

FIG. 5 shows a high-level flow chart illustrating an example method 500 for automatically controlling transient effects in spectral changes due to channel drop scenarios. FIG. 5 is described with regard to the systems and components of FIGS. 1-4, though it should be appreciated that the method 500 may be implemented with other systems and components without departing from the scope of the present disclosure.

Method 500 begins at 505. At 505, method 500 detects a signal drop in an optical fiber from a signal source to a network element. For example, in FIG. 1, the photodetector 134 detects a signal drop in the optical fiber 113 which is connected to a network element comprising an optical switch 121 of an OADM 102. At 510, method 500 switches an input to the network element from the optical fiber to a second optical fiber carrying amplified spontaneous emission. For example, in FIG. 1, the optical switch 136 switches the input to the optical switch 121 from the optical fiber 113 to the optical fiber 133 carrying the ASE generated by the ASE source 132. Method 500 then returns.

Figure 6:
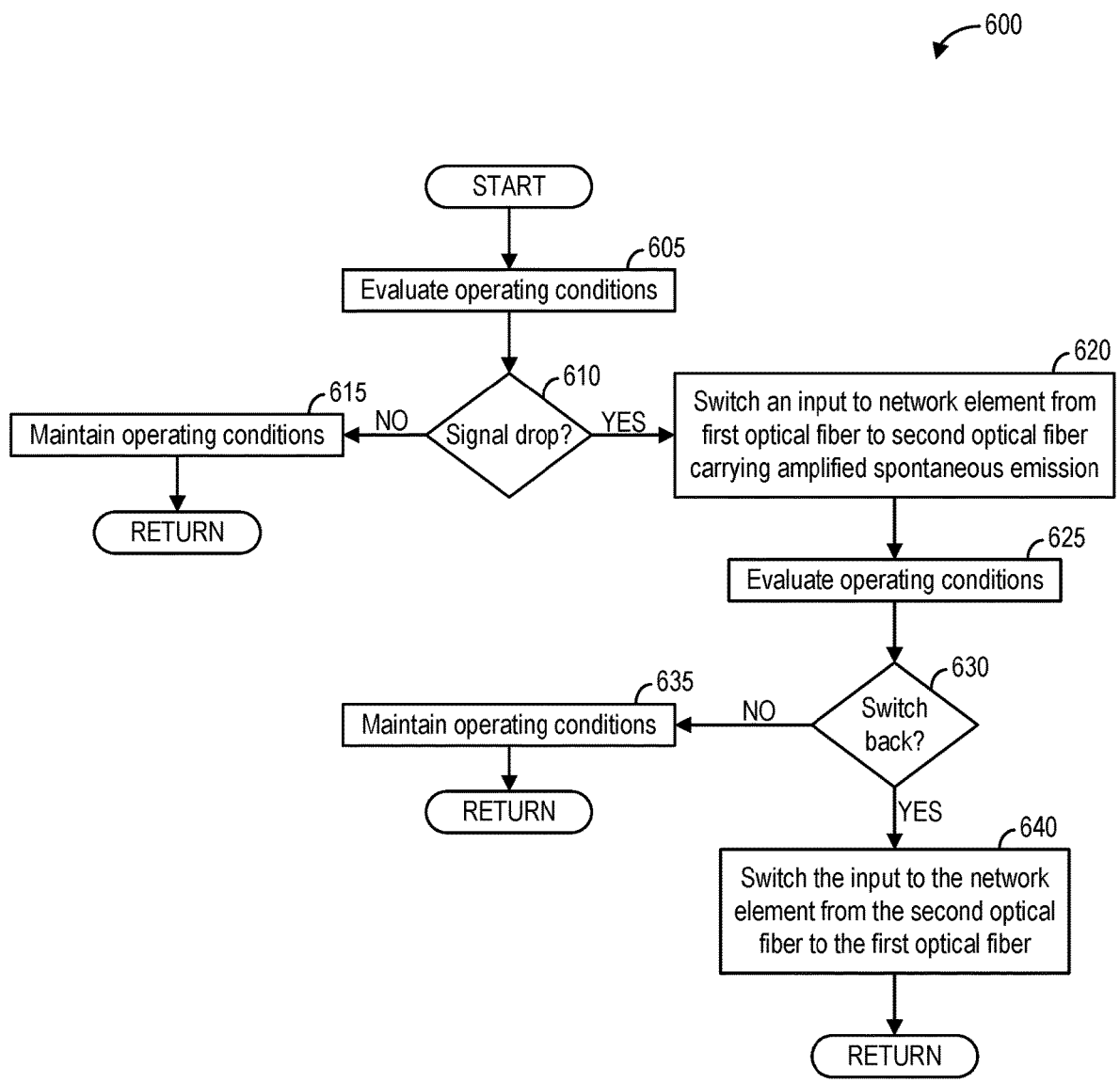
FIG. 6 shows a high-level flow chart illustrating another example method for automatically controlling transient effects in spectral changes due to channel drop scenarios.

FIG. 6 shows a high-level flow chart illustrating another example method 600 for automatically controlling transient effects in spectral changes due to channel drop scenarios. Method 600 is described with regard to the systems and components of FIGS. 1-4, though it should be appreciated that the method 600 may be implemented with other systems and components without departing from the scope of the present disclosure. Method 600 may be implemented as executable instructions and may be executed by a controller, such as one of the controllers 243, 248, 253, and 258.

Method 600 begins at 605. At 605, method 600 evaluates operating conditions. Operating conditions may include, but are not limited to, signal status, switch state, and so on. Evaluating operating conditions may include, for example, evaluating a signal with a photodetector to determine the signal status, or evaluating a status of a switch to determine its current state. At 610, method 600 determines whether there is a signal drop. Method 600 may determine that there is a signal drop based on the signal status of an incoming signal as evaluated at 605, for example, indicating that the incoming signal has been disrupted. If there is not a signal drop ("NO"), method 600 continues to 615, wherein method 600 maintains the operating conditions. Method 600 then returns.

However, if there is a signal drop ("YES") at 610, method 600 continues to 620. At 620, method 600 switches an input to a network element from a first optical fiber to a second optical fiber carrying amplified spontaneous emission. For example, the first optical fiber comprises an optical fiber carrying the signal that was determined to be dropped at 610. Such an optical fiber may thus comprise the optical fiber carrying the incoming signal 201, for example, as depicted in FIG. 2. The switch 244 then switches the input to the WSS 210 from the optical fiber carrying the incoming signal 201 to the optical fiber carrying the attenuated ASE from the ASE source 232 via the attenuator 234. In this way, the dropped signal is replaced by noise, which is filtered by the network element. The spectral gap left by the dropped signal is thus filled in with noise in any output signals of the network element.

Continuing at 625, method 600 evaluates operating conditions. At 630, method 600 then determines whether to switch back from the noise source to the original signal source. Method 600 may determine to switch back to the original source based on the operating conditions, for example. Evaluating the operating conditions at 625 may include evaluating whether the original signal source is restored, for example, or evaluating whether a command signal is received via the original signal source commanding the switch to restore the original signal source. As another example, the operating conditions may include an amount of elapsed time since the inputs were switched, and determining whether to switch back may include determining whether the amount of elapsed time has passed a specified threshold. If method 600 determines not to switch back ("NO"), method 600 may continue to 635, wherein method 600 maintains the operating conditions. Method then returns.

However, referring again to 630, if method 600 determines to switch back ("YES"), method 600 continues to 640. At 640, method 600 switches the input to the network element from the second optical fiber to the first optical fiber. Method 600 then returns.

Figure 7:
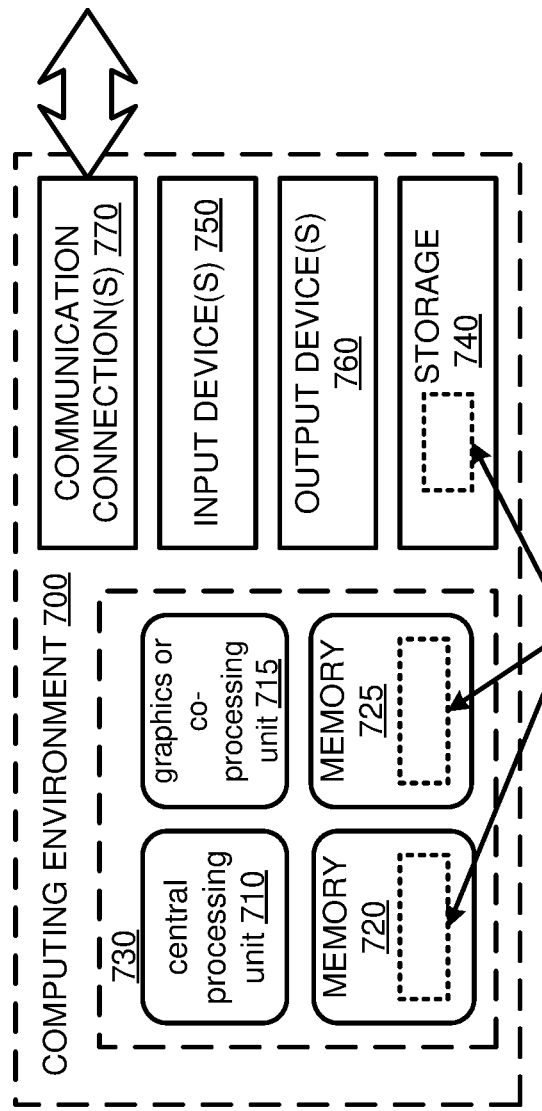
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. An optical add-drop multiplex system, the system comprising:
   a plurality of wavelength selective switches comprising:
   a first wavelength selective switch configured to drop a drop signal from a first input signal of the first wavelength selective switch to provide a demultiplexed signal; and
   a second wavelength selective switch configured to add an add signal to a second input signal of the second wavelength selective switch to provide a multiplexed signal;
   an amplified spontaneous emission source configured to generate a noise signal;
   a plurality of photodetectors comprising:
   a first photodetector configured to monitor the first input signal; and
   a second photodetector configured to monitor the add signal; and
   a plurality of optical switches comprising:
   a first optical switch positioned inline with the first input signal; and
   a second optical switch positioned inline with the add signal;
   wherein the first optical switch switches an input to the first wavelength selective switch from the first input signal to the noise signal responsive to the first photodetector detecting a signal drop in the first input signal;
   wherein the second optical switch switches an input to the second wavelength selective switch from the add signal to the noise signal responsive to the second photodetector detecting a signal drop in the add signal.

2. The system of claim 1, wherein the plurality of wavelength selective switches further comprises:
   a third wavelength selective switch configured to add a second add signal to a third input signal of the third wavelength selective switch to provide a second multiplexed signal; and
   a fourth wavelength selective switch configured to drop a second drop signal from a fourth input signal of the fourth wavelength selective switch to provide a second demultiplexed signal;
   wherein the plurality of photodetectors further comprises:
   a third photodetector configured to monitor the second add signal; and
   a fourth photodetector configured to monitor the fourth input signal; and
   wherein the plurality of optical switches further comprises:
   a third optical switch positioned inline with the second add signal; and
   a fourth optical switch positioned inline with the fourth input signal;
   wherein the third optical switch switches an input to the third wavelength selective switch from the second add input signal to the noise signal responsive to the third photodetector detecting a signal drop in the second add input signal;
   wherein the fourth optical switch switches an input to the fourth wavelength selective switch from the fourth input signal to the noise signal responsive to the fourth photodetector detecting a signal drop in the fourth input signal.

3. The system of claim 2, wherein the third input signal of the third wavelength selective switch comprises the demultiplexed signal, and the second input signal of the second wavelength selective switch comprises the second demultiplexed signal.

4. The system of claim 1, further comprising a splitter element configured to split the noise signal into a plurality of noise signals.

5. The system of claim 4, further comprising a plurality of attenuators configured to attenuate the plurality of noise signals.

6. The system of claim 1, further comprising:
   a first controller communicatively coupled to the first photodetector and the first optical switch, the first controller configured to control the first optical switch responsive to output of the first photodetector; and a second controller communicatively coupled to the second photodetector and the second optical switch, the second controller configured to control the second optical switch responsive to output of the second photodetector.

7. A method for controlling transient effects in optical transport, the method comprising:
   detecting a signal drop in at least one of a first optical fiber from a signal source to a first network element or a second optical fiber from an add signal source to a second network element;
   responsive to detecting the signal drop in the first optical fiber, switching a first input to the first network element from the first optical fiber to a third optical fiber carrying first amplified spontaneous emissions, wherein the first network element comprises a first wavelength selective switch of an optical add-drop multiplexer, and wherein the first wavelength selective switch filters the first amplified spontaneous emissions according to filtering of a signal carried by the first optical fiber; and
   responsive to detecting the signal drop in the second optical fiber, switching a second input to the second network element from the second optical fiber to a fourth optical fiber carrying second amplified spontaneous emissions, wherein the second network element comprises a second wavelength selective switch of the optical add-drop multiplexer, and wherein the second wavelength selective switch filters the second amplified spontaneous emissions according to filtering of a signal carried by the second optical fiber.

8. The method of claim 7, further comprising detecting the signal drop in the first optical fiber with a first photodetector and in the second optical fiber with a second photodetector.

9. The method of claim 8, wherein switching the first input to the first network element from the first optical fiber to the third optical fiber comprises controlling a first optical switch to adjust the first input at a same input port of the first network element from the first optical fiber to the third optical fiber responsive to the first photodetector detecting the signal drop in the first optical fiber.

10. The method of claim 9, further comprising, responsive to detecting the signal drop in the first optical fiber, generating, with an amplified spontaneous emissions source, the first amplified spontaneous emissions, and attenuating the first amplified spontaneous emissions; and
   responsive to detecting the signal drop in the second optical fiber, generating, with the amplified spontaneous emissions source, the second amplified spontaneous emissions, and attenuating the second amplified spontaneous emissions.

11. The method of claim 10, wherein the first amplified spontaneous emissions and the second amplified spontaneous emissions comprise wavelengths across a broadband spectrum including one or more of a C-band spectrum and an L-band spectrum.

12. The method of claim 9, further comprising controlling the optical switch to adjust the first input to the first network element from the third optical fiber to the first optical fiber responsive to detecting, with the first photodetector, a signal in the first optical fiber.

13. The method of claim 12, wherein the signal in the first optical fiber comprises a command to switch the first input to the first network element.

14. The method of claim 7, further comprising generating the first amplified spontaneous emissions and the second amplified spontaneous emissions with an amplified spontaneous emissions source positioned within the optical add-drop multiplexer.

15. The method of claim 7, wherein the optical add-drop multiplexer comprises a reconfigurable optical add-drop multiplexer or an optical filter.

16. An optical add-drop multiplex system, comprising:
   a plurality of network elements;
   an amplified spontaneous emission source configured to generate a noise signal;
   a first photodetector configured to monitor an input signal of the plurality of network elements;
   a second photodetector configured to monitor an add signal of the plurality of network elements;
   a first optical switch configured to switch a first input to a first network element of the plurality of network elements from the input signal to the noise signal responsive to the first photodetector detecting a signal drop in the input signal, wherein the first network element filters the noise signal according to filtering of the input signal; and
   a second optical switch configured to switch a second input to a second network element of the plurality of network elements from the add signal to the noise signal responsive to the second photodetector detecting a signal drop in the add signal, wherein the second network element filters the noise signal according to filtering of the add signal.

17. The system of claim 16, wherein the plurality of network elements comprises a plurality of wavelength selective switches.

18. The system of claim 16, further comprising a splitter configured to split the input signal into a first input signal provided to the first photodetector and a second input signal provided to the first network element.

19. The system of claim 18, further comprising:
   a second splitter configured to split the noise signal into a plurality of noise signals; and
   an attenuator configured to attenuate a first noise signal of the plurality of noise signals;
   wherein the first optical switch is configured to switch the first input to the first network element of the plurality of network elements from the input signal to the attenuated first noise signal responsive to the first photodetector detecting the signal drop in the input signal.

20. The system of claim 16, further comprising a controller communicatively coupled to the first photodetector and the first optical switch, the controller configured to control the first optical switch to switch the first input responsive to the first photodetector detecting the signal drop.

* * * * *